United States Patent [19]

Pierini

[11] 4,331,522

[45] May 25, 1982

[54] REPROCESSING OF SPENT PLASMA

[75] Inventor: Giancarlo Pierini, Varese, Italy

[73] Assignee: European Atomic Energy Commission (EURATOM), Luxembourg, Luxembourg

[21] Appl. No.: 224,014

[22] Filed: Jan. 12, 1981

[51] Int. Cl.³ .............................................. C25F 1/04
[52] U.S. Cl. ...................................... 204/129; 203/5; 423/580
[58] Field of Search ..................... 203/5; 204/129, 130; 423/580

[56] References Cited

U.S. PATENT DOCUMENTS 4,191,626  7/1981  Andrews .............................. 204/129

*Primary Examiner*—R. L. Andrews

*Attorney, Agent, or Firm*—Stevens, Davis, Miller & Mosher

[57] ABSTRACT

A process for removing helium and other impurities from a mixture containing deuterium and tritium, which process comprises the following steps: separating the isotopes of hydrogen from the impurity by catalytic oxidation; condensing out the oxides $H_2O$, $D_2O$ and $T_2O$ thus formed; separating by electrolysis a portion of the said oxides in an electrolytic cell in order to produce a protium-rich portion; distillating the protium-rich portion to separate deuterium and tritium oxides from a distillate rich in water; and electrolyzing the condensate of the distillation step and the non-electrolyzed portion of the first electrolyzing step in order to form a mixture of deuterium and tritium.

Preferably the impure mixture of deuterium and tritium is a waste product of a fusion reactor and the purified deuterium-tritium mixture is recycled to the reactor.

8 Claims, 1 Drawing Figure

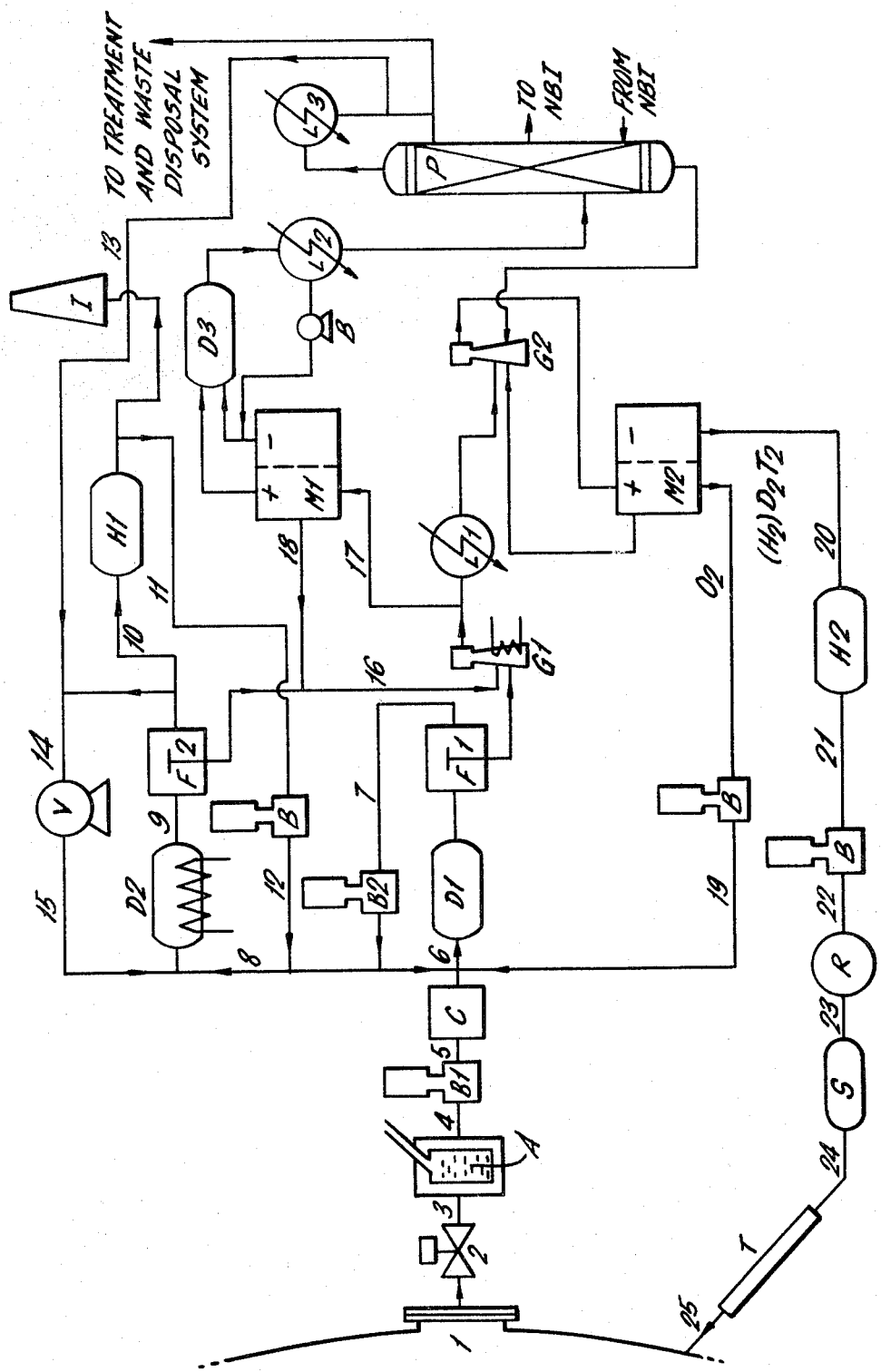

REPROCESSING OF SPENT PLASMA

BACKGROUND OF THE INVENTION

1. Field of the Invention

The present invention relates to a process for removing helium and other impurities from a mixture containing deuterium and tritium. More particularly the present invention relates to the purification of spent plasma from its impurities in such a way as to recover deuterium and tritium in gaseous form for injection continuously or batch-wise into a fusion reactor.

2. Prior Art

The prior art is generally concerned with the purification of plasma continuously whilst it is in a gaseous form throughout. The principal steps of these known processes comprise the separation of deuterium and tritium by cryoadsorption methods, the $H_2$ isotopes-separation by distillation at low temperatures, e.g. 20° to 25° K., and the storage and injection of the plasma into the fusion reactor. The equipment needed for such processes is very expensive and extremely bulky. It is expected to occupy approximately 300 m$^3$ of building space. In the case of an accident, safety rules require auxiliary installations for the clean-up of the volume of the building occupied by the equipment. These installations are very expensive and require several days of continuous operation in the case of a serious accident, for instance the release of all of the tritium stored. The cost of the overall plant would be about 12 million dollars (1978), not including the cost of the building itself.

The most representative report about the design of such a plant is the report LA-6855-P of J. L. Anderson and R. M. Sherman. The loop in that plant is designed to handle 500 moles per day of DT.

A similar feasibility study carried out by Snia-Techint of Rome has given a higher cost, even when the processing rate of DT is reduced to about one half. Another purification method is described and claimed in our United Kingdom Patent Application No. 7902259 which is similar to the present invention but has some inconveniences, such as the relatively high tritium inventory and the applicability of the process to a reduced type of fusion reactor.

The present invention seeks to provide a process for removing helium and other impurities from a mixture containing deuterium and tritium, more particularly a process for the reprocessing of spent plasma removed from a thermofusion reactor, of improved economics and safety.

The process of the present invention is applicable to any plasma formed by mixtures of deuterium and tritium contaminated by the helium produced in accordance with the following fusion reaction:

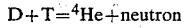

$D+T = {}^4He + neutron$

Other impurities will probably also be present in the plasma stream such as $CO$, $CO_2$, $N_2$, $NO$, $NO_2$, $N(D,T)_3$, $C(D,T)_4$ and $C_2(D,T)_6$ with a total concentration of about 2 to 3%. Even protium is expected to be present at a concentration of about 1% together with some microtraces of $^3He$.

All these impurities originate from many factors, of which the major ones are material degassing phenomena, air infiltration (even if only in micro-quantities), and some neutron reactions.

The prior art is replete with disclosures relating to the treatment of deuterium and tritium mixtures containing the above-mentioned impurities which are expected to accumulate in a real fusion burn.

Two disclosure form the basis of the known processing designs for such a fuel cycle. In the first one it is assumed that recourse can be made to extremely costly and very advanced procedures such as selective impurities cryogenic separation and hydrogen-isotope cryogenic distillation. The overall dimensions of such process units and the other units related to the overall process require a large facility for their containment. Moreover, in order to comply with safety rules it is a compulsory requirement to have an emergency tritium clean-up system in case of an accident. This system depends notably on the atmospheric volume of the plant. For this reason, a large investment and high running costs are demanded in order to maintain the release of tritium into the atmosphere below the present levels which are now becoming more and more strict.

The second processing design stems from the discovery of a process which allows for the complete cycling of the fuel. This process comprises the removal of exhaust plasma and its impurities out from the fusion reactor, the purification of the hydrogen from helium and impurities, the oxidation of the hydrogen isotopes to their oxides, their distillation to remove the non-tritium oxide-containing water and a mixture of deuterium/tritium oxides, their electrolysis to $D_2$ and $T_2$, and lastly the final injection thereof into the toroidal chamber of the reactor after their molar compositions have been correctly adjusted. With respect to the former known process, this latter known process should reduce the containment problems, meet the safety requirements and constraints better, and reduce the volume of the overall plant, which in turn will reduce the cost of the system required for the smaller tritium clean-up emergency system.

On the other hand, the tritium inventory of this latter known process seems to be greater than that of the former known process, and also its application finds some difficulties when the plasma is heated by deuterium neutron beams because the water and tritium-contaminated deuterium stream require either a complementary purification system or the use of a larger column which of course increases the tritium inventory.

SUMMARY OF THE INVENTION

In accordance with the present invention, there is provided a process for removing helium and other impurities from a mixture containing deuterium and tritium, which process comprises the following steps: separating the isotopes of hydrogen from the impurity by catalytic oxidation; condensing out the oxides $H_2O$, $D_2O$ and $T_2O$ thus formed; separating by electrolysis a portion of the said oxides in an electrolytic cell in order to produce a protium-rich portion; distillating the protium-rich portion to separate deuterium and tritium oxides from a distillate rich in water; and electrolysing the condensate of the distillation step and the non-electrolysed portion of the first electrolysing step in order to form a mixture of deuterium and tritium.

BRIEF DESCRIPTION OF THE DRAWING

The single FIGURE of the drawing shows diagrammatically a spent plasma reprocessing system incorporating the present process.

DETAILED DESCRIPTION OF THE PREFERRED EMBODIMENTS

Preferably the process comprises the steps of: oxidising all of the hydrogen isotopes by a catalytic reactor with subsequent separation of the impurities; partially electrolysing the tritiated water until more than 60% of the protium is electrolysed with some deuterium and tritium; distilling this small amount of $(H,D,T)_2O$ to recover a mixture of $(D,T)_2O$ which is fed to a second electrolytic cell together with the unelectrolysed mixture of $(D,T)_2O$; and recycling the oxygen to the first catalytic reactor and deuterium-tritium mixture to the torus after its equilibration.

The impurities stream from the first catalytic reactor contains some deuterium and tritium combined with some chemical compounds such as, for example, $N(H,D,T)_3$ and $C(H,D,T)_4$. These compounds are decomposed in a catalytic reactor at 300° to 500° C. and the tritiated water collected and recycled to the principal stream. The tritium-free impurities ($10^{-3}Ci/m^3$) not absorbed by molecular sieve driers are vented. Preferably the distillation column works under pressure in order to obtain higher separation factors among the oxide species and continuously to remove the gases ($T_2$-$D_2$-$H_2$-$O_2$) formed by radiolysis. The ideal operating conditions (pressure, temperature etc.) are dependent on many factors, in particular on the relative volatilities and vapour rates in the distillation column. Usually, for most situations, the temperature will vary from 20° to 70° C. The electrolytic cells use particular ionic membranes resistant to radiation, which allow high separation factors (of more than 20 for protium and deuterium and of around 2 for deuterium and tritium). They generally comprise asbestos impregnated with copolymers such as S-DVB-AA, S-SVB-AA, and S-DVB-sulfomate.

The liquid electrolyte, which preferably comprises an alkaline solution of KO(D,T) in $(H,D,T)_2O$, is sprayed as an aerosol into the very small anodic volume of the cell. $H_2$, $D_2$ and $T_2$ are given off at the cathode by passing through the ionic membrane in a selective manner.

By operating in this way the tritium inventory is very small and the cathodic stream is highly enriched with the lighter $H_2$ isotope.

In any event, if other alkaline solutions or ionic membranes are used and the electrolyte stream is in liquid phase, the process is always feasible, unless an increased tritium inventory and the purification of the hydrogen isotopes stream from oxygen also become necessary.

The present process is applicable to all tritium/deuterium fusion reactors regardless of their operational modes, i.e. whether continuous or pulsed. In the former case, however, it is quite difficult to calculate the amount of tritium and deuterium to be processed per day, because it depends on different technological procedures (e.g. the use of divertor or cold gas blankets, etc.).

One embodiment of the present invention will now be described, by way of example, with reference to the accompanying drawing which shows diagrammatically a spent plasma reprocessing system.

In the following description, some data are reported. The values given are based on a 1888MW (th) fusion reactor with a burn time/burn+dwell time ratio of 0.78 and a burn-up of 20% which corresponds to a fuel processing rate (DT) of 2.57 g/min.

From the toroidal chamber -1- of the fusion reactor, the exhaust plasma containing the impurities and $^4$He in a variable concentration depending on the burn-up, is pumped out via flutter valve -2- and line -3- to cryosorption pump -A-; since the cryosorption pump is saturated, the gas condensed and absorbed therein is released by heating and transferred by a diaphragm or double bellows pump -B1- by means of lines -4- and -5- to a ballast tank -C-.

The principal stream, comprising DT and its impurities is fed by means of line -6- to an oxidising catalytic reactor -D1-, operating at room temperature, where, in the presence of an excess of oxygen, the stream is almost completely transformed into $H_2O$, $D_2O$ and $T_2O$. These oxides are condensed in -F1- and that which is not oxidised will be recycled by means of pump -B2- through line -7-.

Different types of catalysts can be used. Usually they are small pellets, on whose surface platinum, palladium or CuO have been deposited. Another catalyst which can be used is the commercially trade named Hopcalite. The unoxidised portion containing traces of the hydrogen isotope combined with impurity elements such as, for example, carbon and nitrogen, cannot be released into the atmosphere, but must be treated in order to recover the tritium therein. For this purpose the stream is recycled to another oxidising catalytic reactor -D2-, operating at a temperature of around 500° C., then to a condenser -F2-, and then to a molecular sieve drier system -H1-, via lines -8-, -9-, -10-, -11- and -12- until the tritium activity of the impurities is below $10^{-3}$ Ci/m$^3$. At this point the gas is fed to a chimney I. Even the gases formed in the distillation column (in particular $H_2$, $D_2$, $T_2$ and $O_2$) due to radiolysis are treated in this loop via lines -13-, -14- and -15-. The material which is condensed in -F2- is collected and fed to the sprayer -G1- by means of the line -16-.

The above-mentioned oxides condensed in -F1- are fed to the sprayer -G1- which recycles them in the form of an aerosol to the anodic volume of the electrolytic cell -M1-, by lines -17- and -18-, until a portion of the oxides dissolved in KO (D,T) or another alkaline compound, is electrolysed so that about 60% of the protium therein is separated from the feed mixture.

In the case of a separation factor of 20 between protium and deuterium (experimentally demonstrated) an electrolysis of 5.45% of the oxides is sufficient to meet the proposed separation specification. In this case a mixture of 21%$H_2$, 52.6%$D_2$ and 26.4%$T_2$ is oxidised in the catalytic reactor until complete reaction is achieved by recycling the gas. The oxides species are then cooled in -L2- and fed to the distillation column -P-. The non-electrolysed portion is heated and recondensed at L1 in the sprayer container -G2-, and, together with the collected condensate from the distillation column, is fed into the electrolytic cell -M2- for electrolysis of the hydrogen isotope molecular species. The oxygen produced is recycled by means of line -19- to the first oxidising catalytic reactor because it may contain some tritium formed by radiolysis; while the DT mixture, by means of lines -20-, -21-, -22-, -23-, -24- and -25-, is dried in the molecular sieve system and is stored prior to equilibration for the re-injection to the torus.

The column works under vacuum at a temperature varying from 20° to 70° C. In this particular example, a temperature of about 45° C. has been optimised in order to meet the best conditions for a tritium inventory of only a few grams. The distillate, consisting essentially of $H_2O$, $D_2O$ and a small amount of $T_2O$ ($10^{-2}\%$), is fed to a waste treatment and disposal system. This could be a multistage electrolytic cell in order to recover, if necessary, the enriched portion of tritium oxide and to feed it back again to the distillation column.

The distillation column has been designed according to the projected characteristics of the fusion reactor, taking into consideration the specification of the distillate which cannot contain more than $10^{-2}\%$ of tritium. If the plasma is heated by some means other than the deuterium neutron beam injector (NBI) system, such as radiofrequency or adiabatic compression, the dimensions of the column can be very small: about 1 cm. diameter and 2 m high, the number of actual plates being about 140. In this case, the tritium inventory is significant. When deuterium is heated by a neutron beam system and is to be purified, the same column can accomplish its objective, by increasing its diameter to 5 to 6 cm, whilst still maintaining the tritium inventory at a very low level since it is presumed that the tritium content of the deuterium will be of the order of several parts per thousand (e.g. 0.1%).

In an alternative embodiment (not shown), upstream of the catalytic reactor (D1), a palladium/silver membrane system can be placed if some impurity is expected to contaminate the fuel and will be difficult to remove from the tritiated water. The same system can even replace the actual catalytic reactor (D1).

The advantages of the specific embodiment of the present invention are the following:

Considerable reduction in the cost of the plant (about 10 times or more);

Reduced volume of containment of the plant of about 10 times. This fact notably reduces the cost of the emergency clean-up system, which is related not only to the building space to be treated but also to the low inventory of tritium. Most of the tritium is in liquid form as its oxide and its containment is easy to achieve.

The plant is very reliable. In fact, if necessary, it is possible to increase the capacity or the performance of any unit without significantly increasing the overall cost and volume of the plant, it being a rather cheap and small installation.

The plant is particularly safe because, as we have noted, only a small portion of the plant handles gaseous hydrogen isotopes and in most cases its concentration is less than 1%. For these reasons the low concentration significantly reduces the hydrogen isotopes which can permeat through the containment modules. Since these modules are small, it is both possible and inexpensive to construct an installation for the continuous clean-up of an inert atmosphere contained in the modules.

The tritium inventory is very small, and so is tritium emergency clean-up system which is one of the more expensive units of the plant.

The process can be applied to any type of fusion reactor. In some particular cases, for instance when the plasma is heated by the injection of deuterium neutron beam, the purification of deuterium can be effected in the same but larger column without affecting the tritium inventory.

What is claimed is:

1. A process for removing helium and other impurities from a mixture containing deuterium and tritium, which process comprises the following steps: separating out isotopes of hydrogen from the mixture by catalytic oxidation; condensing out hydrogen isotope oxides thus formed; separating by electrolysis a portion of the said oxides in an electrolytic cell in order to produce a protium-rich portion and a non-electrolysed portion distillating the protium-rich portion to separate deuterium and tritium oxides from a distillate rich in water; and electrolysing condensate from the distillation step and the non-electrolysed portion of the electrolysis separation step in order to form a mixture of deuterium and tritium.

2. A process as claimed in claim 1 wherein a major portion of protium in the form of water in the said protium-rich portion is separated from other hydrogen isotope oxides by electrolysis using a selective ionic membrane.

3. A process as claimed in claim 1 wherein a minor portion of the said oxides is separated by distillation under reduced pressure.

4. A process as claimed in claim 2 wherein the said other hydrogen isotope oxides are electrolysed.

5. A process as claimed in claim 1 wherein waste products from the catalytic oxidation step, from the distillation step and from the electrolysis steps, including radiolysis products, are oxidised and absorbed by a molecular sieve drier system; any remaining inactive gases being vented.

6. A process as claimed in claim 3 wherein distillate from the said minor portion is subjected to complementary purification by multi-stage electrolysis in order to recover tritium in any of its diatomic oxide forms; which recovered tritium is then recycled to the said oxide distillation step.

7. A process as claimed in claim 1 wherein most of the said process steps handle tritium in the form of its liquid oxides.

8. A process as claimed in any one of the preceding claims wherein the said mixture of deuterium and tritium to be processed is a waste product of a fusion reactor and wherein the mixture of deuterium and tritium formed after processing is recycled to the said reactor.

* * * * *